US009212784B2

(12) United States Patent  (10) Patent No.: US 9,212,784 B2
Frenal et al.  (45) Date of Patent: Dec. 15, 2015

(54) MEDICAL GAS CYLINDER COUPLING SYSTEM

(71) Applicant: L'Air Liquide, Societe Anonyme Pour l'Etude et l'Exploitation des Procedes Georges Claude, Paris (FR)

(72) Inventors: Antoine Frenal, Ezanville (FR); Vincent Graviere, Montrouge (FR); Renaud Ligonesche, Herblay (FR); Chiara Tarantello, Puteaux (FR); Adrien Trevisan, Newuilly sur Seine (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 14/479,551

(22) Filed: Sep. 8, 2014

(65) Prior Publication Data

US 2015/0076160 A1  Mar. 19, 2015

(30) Foreign Application Priority Data

Sep. 16, 2013  (FR) ...................................... 13 58872

(51) Int. Cl.
 *F17C 13/08* (2006.01)
 *F16L 3/12* (2006.01)
 (Continued)

(52) U.S. Cl.
 CPC ............. *F17C 13/084* (2013.01); *F16L 3/1203* (2013.01); *F16L 3/127* (2013.01); *F17C 1/00* (2013.01);
 (Continued)

(58) Field of Classification Search
 CPC ........ A62C 13/78; B60N 3/105; B60N 3/106; F24H 9/06; A62B 25/00; A47J 47/16; F16L 3/1203; F16L 3/127; F17C 13/08; F17C 13/084; F17C 1/00; F17C 2205/0188; F17C 2270/025; F17C 2270/0192; F17C 2201/0104; F17C 2201/032; F17C 2201/058; F17C 2201/0153; F17C 2201/0165; F17C 2201/0308; F17C 2221/011; F17C 2221/03; F17C 2221/031; F17C 2223/0123; F17C 2223/035; F17C 2270/02; F17C 2270/05
 USPC ............. 248/316.2, 313, 316.3, 316.5, 316.6, 248/316.1
 See application file for complete search history.

(56) References Cited

U.S. PATENT DOCUMENTS 573,891 A * 12/1896 Martin ........................... 248/113
1,007,062 A * 10/1911 Carlson ......................... 248/313
(Continued)

FOREIGN PATENT DOCUMENTS

EP   629812   12/1994
EP   2586481   5/2013
(Continued)

OTHER PUBLICATIONS

FR 1358872, French Search Report and Written Opinion, Jun. 24, 2014 (7 pp).

*Primary Examiner* — Nkeisha Smith
(74) *Attorney, Agent, or Firm* — Allen E. White

(57) ABSTRACT

The invention relates to a coupling system for a gas container, in particular a gas cylinder (9), comprising a base (1) which is designed to be fixed on a support (10), wherein the base (1) comprises a first arm (3a) and a second arm (3b), at least one of which is mobile in pivoting relative to the other, and an activation unit (4) which co-operates with at least one of said first and second arms (3a, 3b), such as to pivot at least one of said first and second arms (3a, 3b) to bring them towards one another, when said activation unit (4) is activated. The invention also relates to a support/cylinder assembly comprising a coupling system of this type, and a gas cylinder (9) retained by the arms (3a, 3b) of said coupling system.

9 Claims, 3 Drawing Sheets

(51) Int. Cl.
    *F16L 3/127*     (2006.01)
    *F17C 1/00*     (2006.01)
    *A62C 13/78*     (2006.01)

(52) U.S. Cl.
    CPC ......... *A62C 13/78* (2013.01); *F17C 2201/0104* (2013.01); *F17C 2201/032* (2013.01); *F17C 2201/058* (2013.01); *F17C 2205/0153* (2013.01); *F17C 2205/0165* (2013.01); *F17C 2205/0188* (2013.01); *F17C 2205/0192* (2013.01); *F17C 2205/0308* (2013.01); *F17C 2221/011* (2013.01); *F17C 2221/03* (2013.01); *F17C 2221/031* (2013.01); *F17C 2223/0123* (2013.01); *F17C 2223/035* (2013.01); *F17C 2260/015* (2013.01); *F17C 2270/02* (2013.01); *F17C 2270/025* (2013.01); *F17C 2270/05* (2013.01)

(56) References Cited

U.S. PATENT DOCUMENTS

| | | | | |
|---|---|---|---|---|
| 1,761,497 | A * | 6/1930 | Smith | 224/222 |
| 1,968,462 | A * | 7/1934 | Merhell | 248/113 |
| 2,277,738 | A * | 3/1942 | Wilkinson | 210/249 |
| 3,547,391 | A * | 12/1970 | Johnson | 248/311.3 |
| 3,603,550 | A * | 9/1971 | Byrd | 248/313 |
| 3,780,972 | A * | 12/1973 | Brodersen | 248/313 |
| 3,823,907 | A * | 7/1974 | Ziaylek, Jr. | 248/313 |
| 4,586,687 | A * | 5/1986 | Ziaylek, Jr. | 248/313 |
| 4,848,714 | A * | 7/1989 | Ziaylek et al. | 248/313 |
| 4,955,574 | A * | 9/1990 | Freier | 248/316.5 |
| 5,098,054 | A * | 3/1992 | Dyer | 248/313 |
| 5,312,081 | A * | 5/1994 | Martin | 248/316.3 |
| 5,318,266 | A * | 6/1994 | Liu | 248/311.2 |
| 5,344,112 | A * | 9/1994 | Peterson et al. | 248/313 |
| 5,354,029 | A * | 10/1994 | Ziaylek et al. | 248/313 |
| 5,362,022 | A * | 11/1994 | McLoughlin et al. | 248/313 |
| 5,533,701 | A * | 7/1996 | Trank | 248/316.4 |
| 5,572,776 | A * | 11/1996 | Murphy et al. | 24/543 |
| 6,059,245 | A * | 5/2000 | Hermansen et al. | 248/311.2 |
| 6,830,226 | B2 * | 12/2004 | Field et al. | 248/313 |
| 6,883,766 | B1 * | 4/2005 | Ziaylek et al. | 248/313 |
| 8,035,525 | B2 * | 10/2011 | Noonchester | 340/573.1 |
| 8,136,774 | B2 * | 3/2012 | Melittas | 248/210 |
| 8,191,848 | B2 * | 6/2012 | McLoughlin et al. | 248/313 |
| 8,469,247 | B2 * | 6/2013 | Nicoletti | 224/403 |
| 8,573,576 | B2 * | 11/2013 | Clark et al. | 269/217 |
| 8,622,469 | B2 * | 1/2014 | Hogg et al. | 297/188.04 |
| 8,720,841 | B2 * | 5/2014 | Morren et al. | 248/316.5 |
| 8,783,636 | B2 * | 7/2014 | Okita | 248/316.3 |
| 2009/0084739 | A1 | 4/2009 | Shock et al. | |
| 2011/0042537 | A1 * | 2/2011 | Fahldiek | 248/313 |

FOREIGN PATENT DOCUMENTS

| | | |
|---|---|---|
| WO | WO 2008033753 | 3/2008 |
| WO | WO 2010109206 | 9/2010 |

* cited by examiner

MEDICAL GAS CYLINDER COUPLING SYSTEM

CROSS REFERENCE TO RELATED APPLICATIONS

This application claims the benefit of priority under 35 U.S.C. §119 (a) and (b) to French Patent Application No. 1358872 filed Sep. 16, 2013, the entire contents of which are incorporated herein by reference.

BACKGROUND

The present invention describes a coupling system which makes it possible to fix a gas container, in particular a gas cylinder, in particular a medical gas cylinder, easily, stably and securely on a support, such as a wall, a partition wall, a hospital bed, a stretcher, an armchair, etc.

SUMMARY

Containers, in particular medical gas cylinders, which are used in particular in a hospital environment, at home, or in emergency departments or vehicles, must be able to be fixed on different supports, such as a wall, a partition wall, a hospital bed, a stretcher, an armchair, etc.

They must therefore be provided with their own coupling system which is supported by the container itself, or, if applicable, an independent device can be used which allows the container to be coupled to a support.

Thus, document EP-A-629812 proposes providing a notch facing downwards in the low part of the protective cowl, also known as a "cap", which equips a gas cylinder, and is used to protect the valve or pressure-reducing valve of the cylinder against impacts. This notch makes it possible to hang the cylinder on various supports, and in particular on bed rails.

Document EP-A-2586481 proposes equipping the protective cowl of a gas cylinder with a pivoting coupling structure comprising two hooks which allow the cylinder to be hung, in particular on the rails of hospital beds.

In addition, wall systems are also known which are designed to be fixed on a vertical support, for example a wall or a partition wall, in the form of racks or the like, in which the bodies of the cylinders are inserted, whilst being retained by straps or the like.

However, these systems are not totally satisfactory, and have disadvantages, i.e. in particular:
  the gas cylinders which are equipped with protective cowls with stowage notches or hooks are not fixed stably, since they are not secured, and can consequently fall, in particular if someone accidentally bangs the cylinder. This constitutes a risk for the user and for the equipment itself. In addition, it makes it necessary to equip all the cylinders with specific protective cowls, which can represent a substantial cost.
  the systems of the wall rack type are cumbersome, and handling of the cylinders is not always easy. Thus, in general, it is necessary to lift the gas cylinder in order to insert it in a receptacle of the rack, which is not convenient, and can cause injury to the user.

The problem to be solved therefore consists of proposing an improved coupling system for a gas container, in particular a gas cylinder, in particular a medical gas cylinder, i.e. which does not have some or all of the aforementioned disadvantages, such as to minimize any situation of instability and limit the risks of the container, in particular a gas cylinder, falling and causing injury to the user.

The solution according to the invention is a coupling system for a gas container, in particular a gas cylinder, comprising a base which is designed to be fixed on a support, in particular a vertical support, wherein the base comprises a first arm and a second arm, at least one of which is mobile in pivoting relative to the other, and an activation unit which co-operates with at least one of said first and second arms, such as to pivot at least one of said first and second arms to bring them towards one another, when said activation unit is activated.

Depending on the case, the coupling system according to the invention can comprise one or more of the following technical characteristics:
  the gas container is a gas cylinder, in particular a medical gas cylinder;
  the activation unit is designed to be activated, and can be activated, by insertion of a gas cylinder between said first and second arms, said gas cylinder exerting mechanical pressure on said activation unit when it is inserted by a user;
  said first and second arms are mobile in pivoting;
  said first and second arms are mobile in pivoting around a single axis or two axes, and preferably two parallel axes;
  said first and second arms are designed to pivot, and can pivot, synchronously, i.e. simultaneously. In other words, the pivoting of the two arms takes place at the same time or approximately at the same time;
  said first and second arms have a form generally of an arc of a circle, and preferably a half-circle, or almost a half-circle;
  when said activation unit is activated by being put into contact with a gas cylinder, said activation unit acts directly or indirectly on one of the arms or on said first and second arms such as to pivot at least one of said first and second arms and to bring them towards one another, thus encircling said gas cylinder or protective cowl arranged on said gas cylinder;
  the activation unit is arranged on the front surface of the base, between said first and second arms;
  the system comprises a locking system which makes it possible to block said first and second arms in the position in which they are brought towards one another, i.e. in the so-called "closed" position, when a gas cylinder is inserted between said first and second arms, and acts on the activation unit;
  it comprises a release mechanism which can be activated by a user, and acts on the locking mechanism when said release mechanism is activated by the user, in order to release at least one of said first and second arms, and to permit pivoting of said at least one arm by spacing it from the other arm, and preferably simultaneous or synchronous pivoting of the two arms towards the so-called "open" position;
  the release mechanism comprises a release unit which projects on the base, and preferably the activation unit is a push button;
  the release unit is supported by one of the lateral walls or by the upper wall of the base;
  the ends of the two arms are formed to have support surfaces, on one or the other of which a user can exert digital or manual pressure, in order to release the arms and allow them to go from the so-called "closed" position to the so-called "open" position, and thus make it possible to extract the cylinder.

The invention also relates to a support/cylinder assembly comprising a coupling system according to the invention, and a gas cylinder retained by the arms of said coupling system, and preferably a cylinder for a medical gas selected from amongst oxygen, air, oxygen-enriched air, or a mixture of $N_2O$/oxygen, helium/oxygen, or another mixture.

BRIEF DESCRIPTION OF THE DRAWINGS

The present invention will now be described in greater detail with reference to the appended Figures in which.

DESCRIPTION OF PREFERRED EMBODIMENTS

Figure 1:
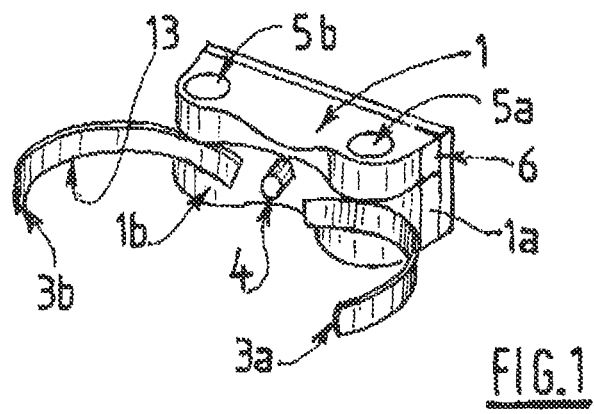
FIG. 1 and FIG. 2 represent a first embodiment of a coupling system for a gas cylinder according to the invention.
Figure 2:
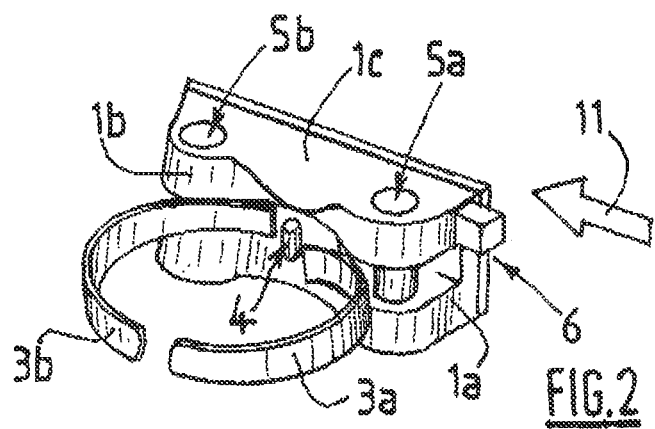

FIGS. 1 and 2 represent a first embodiment of a coupling system for a gas cylinder 9 according to the present invention, which is shown in the so-called "open" position (FIG. 1) and in the so-called "closed" position (FIG. 2).

More specifically, the coupling system for a gas cylinder 9 in FIGS. 1 and 2 comprises a base 1, i.e. a plinth, which is designed to be fixed on a support 10, such as a wall, a partition wall, a hospital bed, a stretcher, an armchair or the like. It can be fixed on the support 10 by any suitable known means, for example by screwing.

The base 1 can be made of plastic material such as PVC, PE, PET, PP, PMMA, PU, etc.

In addition, the base 1 comprises two arms 3a, 3b and an activation unit 4 arranged between said arms 3a, 3b, i.e. the first arm 3a and the second arm 3b. The first arm 3a and/or the second arm 3b are mobile in pivoting around one or more rotational shafts, and preferably around two shafts 5a, 5b, such as to be able to be brought towards one another or spaced from one another simply by pivoting.

The arms 3a, 3b pivot in the direction which tends to bring them towards one another when they are to adopt the so-called "closed" position in FIG. 2, and conversely, they pivot in the opposite direction which tends to space them from one another when they are to adopt the so-called "open" position in FIG. 1, as explained hereinafter.

The base 1 also comprises an activation unit 4 such as a push button, which is arranged between said first and second arms 3a, 3b, and projects on the front surface 1b of the base 1, i.e. which projects towards the exterior as can be seen in FIG. 1, when the arms 3a, 3b are in the "open" position.

Figure 3:
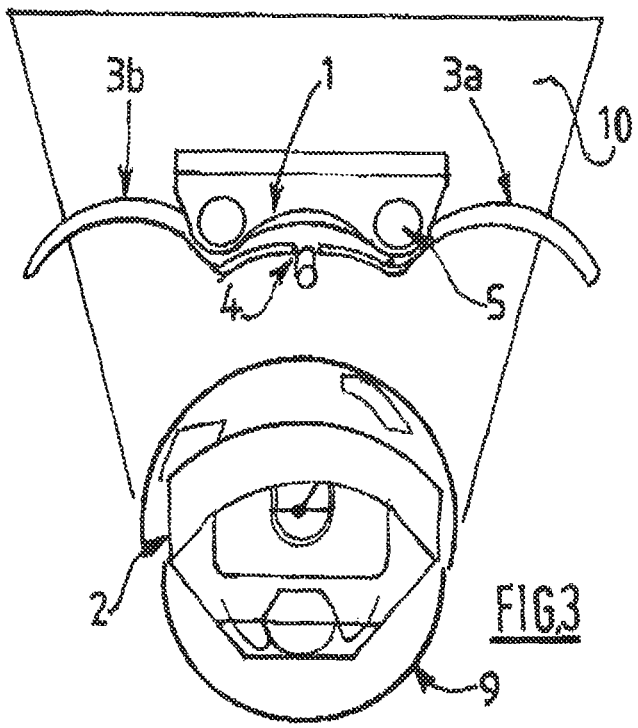
FIG. 3 schematizes the insertion of a gas cylinder in the coupling system in FIG. 1.

For its part, the activation unit 4 co-operates with the first and second arms 3a, 3b, such as to implement their pivoting in the direction of bringing them towards one another when said activation unit 4 is activated by insertion of a gas cylinder 9 between said arms 3a, 3b as illustrated in FIG. 3.

More specifically, the insertion by a user of a medical gas cylinder between said first and second arms 3a, 3b will give rise to mechanical contact between the gas cylinder, for example by means of its cowl, with the activation unit 4, i.e. the cylinder 9 is supported on the unit 4.

The support force thus created and exerted by the cylinder 9 will thrust the activation unit 4 in the direction of the base 1 and give rise to the pivoting of the arms 3a, 3b in the direction in which they are brought towards one another, in the manner of the jaws of pliers.

For example, at least part of the push button which constitutes the activation unit 4 will penetrate in the base 1 and be supported directly or indirectly on the distal end of the arms 3a, 3b which is situated in the base 1, such as to give rise to pivoting of the arms around the shafts 5a, 5b under the effect of the mechanical force which is thus exerted.

Figures 4, 5:
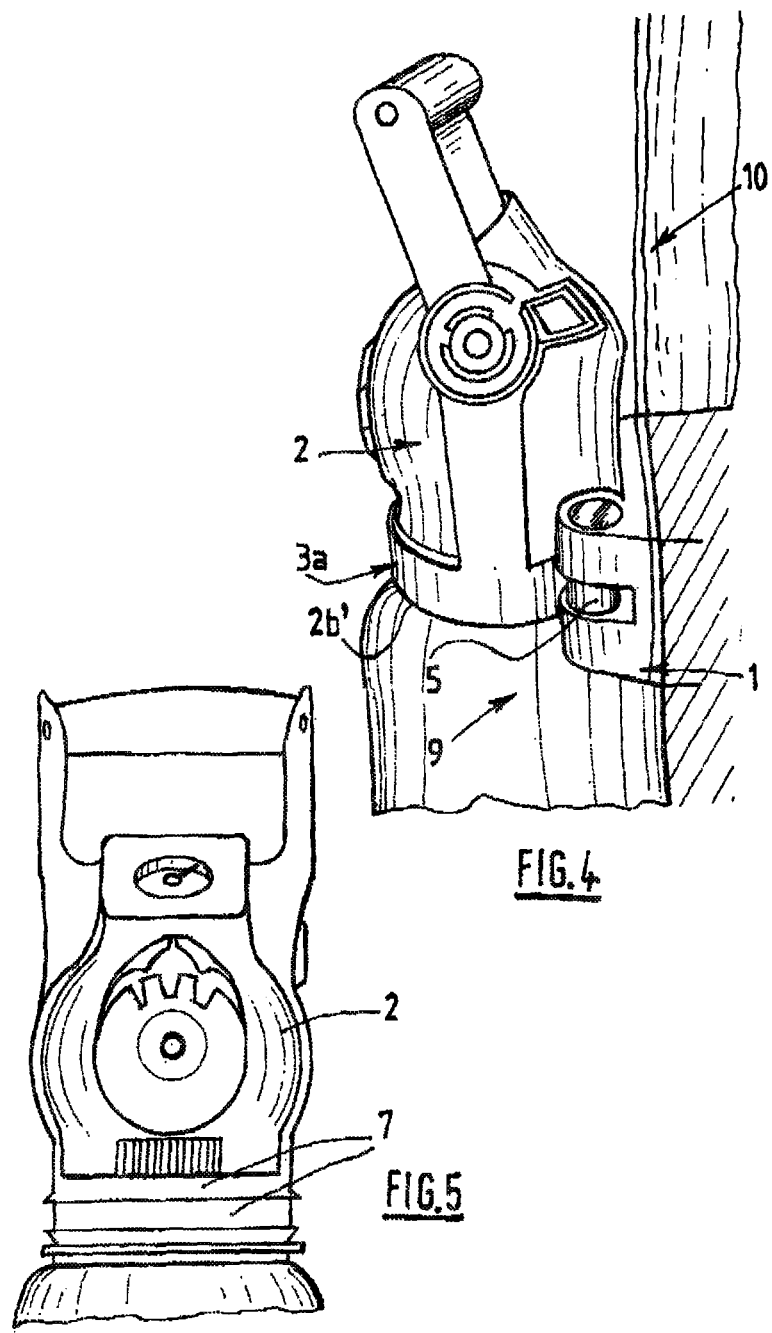
FIG. 4 shows a gas cylinder after insertion in the coupling system in FIG. 1.
FIG. 5 shows a detail of a particular protective cowl designed to be rendered integral with a coupling system for a gas cylinder according to the invention.

The arms 3a, 3b will then pivot simultaneously, i.e. synchronously, and go from the so-called "open" position in FIG. 1 to the so-called "closed" position in FIG. 2, and then encircle the cylinder 9, for example at its cowl 2, as shown in FIG. 4, such as to render the cylinder integral with the base 1 and retain it there by means of said arms 3a, 3b.

As can be seen in the Figures, the first and second arms 3a, 3b are in this case in the general form of an arc of a circle, and preferably a half-circle or almost a half-circle, such as to match the contours of the shank of the gas cylinder 9, or, depending on the embodiment concerned, the contours of the protective cowl 2 with which the gas cylinder 9 is equipped. Preferably, the inner profile in the form of an arc of a circle of the inner surface 13 of the arms 3a, 3b corresponds approximately to the outer profile of the shank or of the cowl 2 of the cylinder 9 in the region where the arms 3a, 3b encircle said shank or cowl 2.

When the arms 3a, 3b are in the so-called "closed" position, their pivoting is blocked by means of a locking mechanism arranged in the base 1, such as to maintain said arms 3a, 3b in the position in which they are brought towards one another (FIG. 4), when a gas cylinder 9 is positioned between them and acts on the activation unit 4, as explained hereinafter.

In this so-called "closed" position, the cylinder 9 is rendered integral with, and supported by, the base 1. Any risk of falling or the like is then eliminated. The insertion of the cylinder 9 between the two arms 3a, 3b is extremely easy, and does not constitute any danger for the user.

Depending on the embodiment selected, the cylinder 9 can be retained by the arms 3a, 3b either at its protective cowl 2, or at its cylindrical body or shank.

In addition, in order to make it possible to release the cylinder 9 from the coupling support, a release mechanism is also provided, comprising a release unit 6, such as a push button which can be activated by a user (activation in the direction of the arrow 11 in FIG. 2), who acts on the locking mechanism such as to release the arms 3a, 3b and allow them to be pivoted and spaced from one another, i.e. in the direction which tends to bring them to the so-called "open" position, and thus permit removal of the gas cylinder 9.

As can be seen in FIGS. 1 and 2, when the push button 6 is activated by the user (direction of the arrow 11), it penetrates at least partly in the body or housing of the base 1, and acts directly or indirectly on the locking mechanism in order to release the arms 3a, 3b.

In order to facilitate the return of the arms 3a, 3b from the "closed" position to the "open" position or conversely, and/or the return of the push button to its non-activated position (FIG. 1), the base 1 can be provided with one or more return means, such as springs or the like, or a rod and cam system.

In the embodiment in FIGS. 1 to 4, the cylinder 9 is fixed frontally and at the neck 2b of the protective cap or cowl 2. However, it is also possible to design the coupling system such that the fixing takes place at the shank, i.e. the cylindrical body of the gas cylinder 9.

Advantageously, the protective cowl 2 is provided with one or more receptacles 7 such as one or more rails or grooves, in which the arms 3a, 3b are accommodated when they encircle the cowl 2 of the cylinder 9, as illustrated in FIG. 4, and thus improve the retention of the cylinder 9 in the coupling support of the invention.

Figure 6:
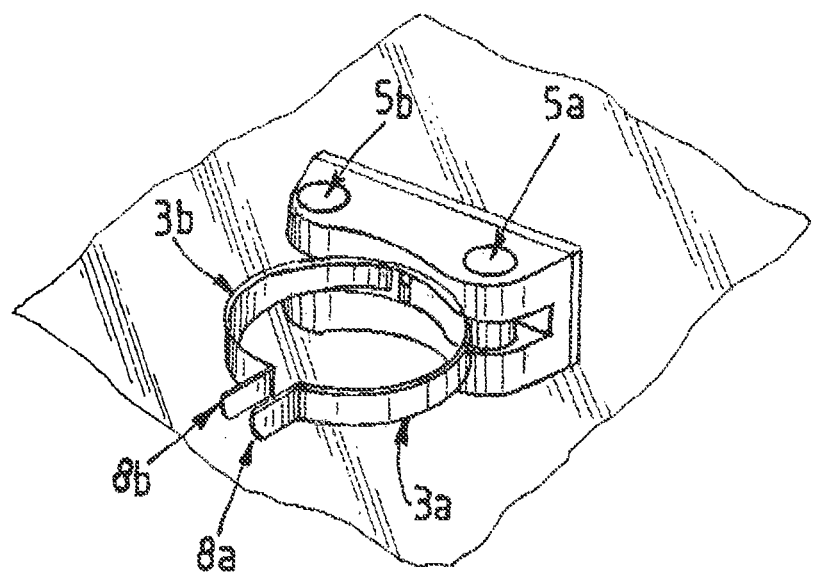
FIG. 6 and FIG. 7 represent a second embodiment of a coupling system for a gas cylinder according to the invention.
Figure 7:
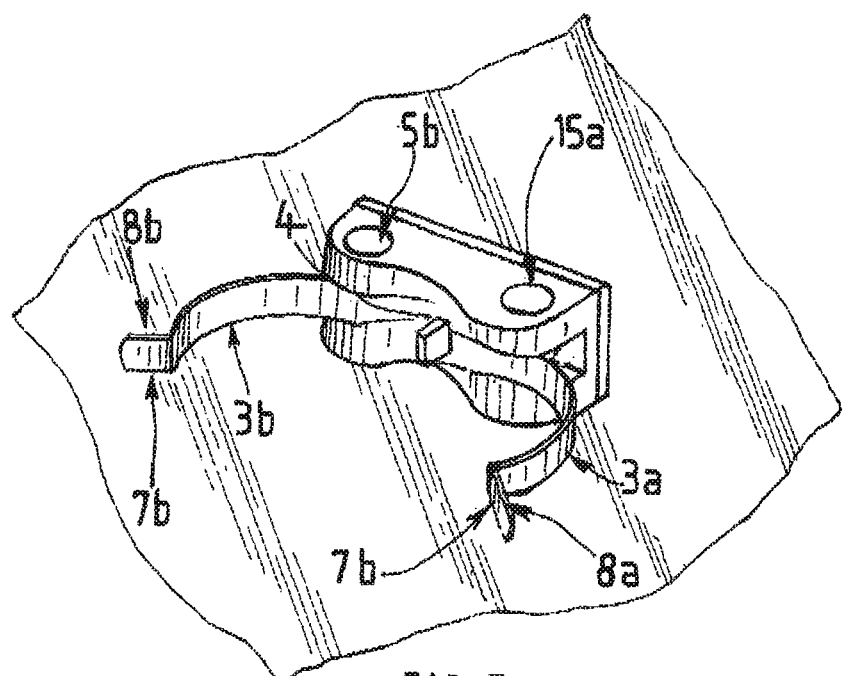

In addition, FIGS. 6 and 7 schematize a second embodiment of a coupling system for a gas cylinder according to the invention, wherein the release mechanism which makes it possible to release the cylinder 9 from the coupling support is supported by the ends 8a, 8b of the two arms 3a, 3b respectively. In this second embodiment, the push button 6 of the embodiment in FIGS. 1 to 3 has therefore been eliminated.

More specifically, the ends 8a, 8b of the two arms 3a, 3b are formed in order to allow the user to apply to them manual or digital force which is sufficient to give rise to spacing of the arms 3a, 3b from one another, i.e. to move them apart from one another by pivoting around the shafts 5a, 5b under the effect of the spacing force applied by the user. This makes it possible to return the arms 3a, 3b to the so-called "open" position, and permits the release and simultaneous removal of the gas cylinder 9.

More specifically, as can be seen in the Figures, the ends 8a, 8b of the two arms 3a, 3b are formed such as to have support surfaces 7a, 7b which face one another, whilst being spaced from one another, on which the user can exert pressure.

It is sufficient for the user to exert a spacing force, i.e. manual or digital pressure, on only one of the two ends 8a, 8b of the arms 3a, 3b, in order for the cylinder 9 to be released. In fact, the movement of the two arms 3a, 3b is preferably synchronized, and consequently applying the spacing force to one of the arms 3a, 3b will be sufficient to release both arms 3a, 3b, which hitherto had been maintained in the so-called "closed" position by the locking mechanism.

It should be emphasized that the coupling system for a gas cylinder according to the invention can also combine the elements of both the above-described embodiments, i.e. it can include a release push button as illustrated in FIGS. 1 and 2, and can also have pivoting arms 3a, 3b, the ends 8a, 8b of which are formed so as to have support surfaces 7a, 7b as illustrated in FIGS. 6 and 7. This provides the user with two different possibilities for releasing the cylinder 9.

Irrespective of the embodiment concerned, the coupling system for a gas cylinder according to the invention makes it possible to fix medical gas cylinders with different diameters easily, stably and securely, such as to minimize instances of the cylinder falling, and therefore to limit the risk of causing injury to the user and damaging the equipment.

In all cases, the present invention is not limited to the medical field, and can be used in all fields which use gas stored in gas containers, such as cylinders, and in particular in the foodstuffs, electronic, welding/cutting fields, etc.

The invention claimed is:

1. A coupling system for a gas container, in particular a gas cylinder, comprising a base which is designed to be fixed on a support, wherein the base comprises:
    a first arm and a second arm, at least one of which is mobile in pivoting relative to an other; and
    an activation unit which co-operates with at least one of said first and second arms, such as to pivot at least one of said first and second arms to bring them towards one another, when said activation unit is activated,
wherein said activation unit is designed to be activated, and can be activated, by insertion of a gas cylinder between said first and second arms, said gas cylinder exerting mechanical pressure on said activation unit,
    wherein the activation unit is arranged on a front surface of the base, between said first and second arms,
    wherein the system comprises a release mechanism which can be activated by a user, and acts on a locking mechanism, in order to release at least one of said first and second arms, and to permit pivoting of said at least one of said first and second arms by spacing said at least one of said first and second arms from an other arm, and
    wherein the release mechanism comprises a release unit which projects on the base, and wherein the activation unit is a push button.

2. The system of claim 1, wherein said first and second arms are both mobile in pivoting.

3. The system of claim 2, wherein said first and second arms are designed to pivot, and can pivot, synchronously or simultaneously.

4. The system of claim 2, wherein said first and second arms have a form generally of an arc of a circle.

5. The system of claim 1, wherein, when said activation unit is activated by being put into contact with said gas cylinder, the activation unit acts directly or indirectly on one of the arms or on both of said first and second arms such as to pivot at least one of said first and second arms and to bring the arms towards one another, thus encircling said gas cylinder or protective cowl arranged on said gas cylinder.

6. The system of claim 1, wherein the locking mechanism makes it possible to block said first and second arms in a position in which the arms are brought towards one another, when said gas cylinder is inserted between said first and second arms and acts on the activation unit.

7. The system of claim 1, wherein the release unit is supported by a lateral wall of the base or by an upper wall of the base.

8. The system of claim 1, wherein ends of said first and second arms are formed to have support surfaces.

9. A support/cylinder assembly comprising a coupling system for a gas container, in particular a gas cylinder, comprising a base which is designed to be fixed on a support, wherein the base comprises: a first arm and a second arm, at least one of which is mobile in pivoting relative to an other; and an activation unit which co-operates with at least one of said first and second arms, such as to pivot at least one of said first and second arms to bring them towards one another, when said activation unit is activated, wherein said activation unit is designed to be activated, and can be activated, by insertion of a gas cylinder between said first and second arms, said gas cylinder exerting mechanical pressure on said activation unit, wherein the activation unit is arranged on a front surface of the base, between said first and second arms, wherein the system comprises a release mechanism which can be activated by a user, and acts on a locking mechanism, in order to release at least one of said first and second arms, and to permit pivoting of said at least one of said first and second arms by spacing said at least one of said first and second arms from an other arm, and wherein the release mechanism comprises a release unit which projects on the base, and wherein the activation unit is a push button, and a gas cylinder retained by the arms of said coupling system.

* * * * *